United States Patent
Iwamoto

(10) Patent No.: US 8,595,747 B2
(45) Date of Patent: Nov. 26, 2013

(54) EFFICIENT TASK SCHEDULING BY ASSIGNING FIXED REGISTERS TO SCHEDULER

(75) Inventor: Tatsuya Iwamoto, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1941 days.

(21) Appl. No.: 11/321,711

(22) Filed: Dec. 29, 2005

(65) Prior Publication Data

US 2007/0157199 A1    Jul. 5, 2007

(51) Int. Cl.
*G06F 9/46* (2006.01)

(52) U.S. Cl.
USPC .......................... 718/108; 718/104; 718/107

(58) Field of Classification Search
USPC ............. 718/1, 200, 101, 102, 103, 104, 105, 718/108
See application file for complete search history.

(56) References Cited

U.S. PATENT DOCUMENTS

| | | | |
|---|---|---|---|
| 3,496,551 A | 2/1970 | Driscoll et al. | 340/172.5 |
| 3,566,357 A | 2/1971 | Ling | 340/172.5 |
| 3,596,257 A | 7/1971 | Patel | |
| 5,047,923 A | 9/1991 | Elstner et al. | |
| 5,136,712 A | 8/1992 | Perazzoli et al. | |
| 5,185,694 A | 2/1993 | Edenfield et al. | |
| 5,418,956 A * | 5/1995 | Willman | 711/206 |
| 5,452,452 A | 9/1995 | Gaetner et al. | 395/650 |
| 5,493,687 A * | 2/1996 | Garg et al. | 712/23 |
| 5,504,901 A | 4/1996 | Peterson | |
| 5,528,513 A | 6/1996 | Vaitzblit et al. | |
| 5,592,671 A | 1/1997 | Hirayama | 385/674 |
| 5,634,058 A * | 5/1997 | Allen et al. | 717/163 |
| 5,717,933 A * | 2/1998 | Mann | 710/262 |
| 5,727,211 A * | 3/1998 | Gulsen | 718/108 |
| 5,745,778 A | 4/1998 | Alfieri | 395/800.01 |
| 5,794,017 A | 8/1998 | Evans et al. | 395/507 |
| 5,832,262 A | 11/1998 | Johnson et al. | 395/672 |
| 5,987,258 A | 11/1999 | Daniel et al. | 395/709 |
| 5,987,495 A * | 11/1999 | Ault et al. | 718/108 |
| 6,003,112 A | 12/1999 | Tetrick | |
| 6,144,986 A | 11/2000 | Silver | |

(Continued)

FOREIGN PATENT DOCUMENTS

| | | |
|---|---|---|
| EP | 459931 | 12/1991 |
| EP | 0 806 730 | 11/1997 |

(Continued)

OTHER PUBLICATIONS

U.S. Appl. No. 11/238,087, entitled "SPU Task Manager for Cell Processor", to John P. Bates et al, filed Sep. 27, 2005.

(Continued)

*Primary Examiner* — Abdullah Al Kawsar
(74) *Attorney, Agent, or Firm* — Joshua D. Isenberg; JDI Patent

(57) ABSTRACT

Task scheduling in a processing system having a main memory and a processor having a plurality of software-configurable registers is disclosed. The processor may be a synergistic processing unit (SPU) of a cell processor. The processing system operates under the control of a kernel and a program code. A subset of the plurality of software-configurable registers is reserved for use by the kernel. Upon occurrence of an interrupt event requiring control of the processor by the kernel, the kernel may be run on the processor without saving the contents the plurality of registers.

21 Claims, 2 Drawing Sheets

(56) References Cited

U.S. PATENT DOCUMENTS

| | | |
|---|---|---|
| 6,279,040 B1 | 8/2001 | Ma et al. |
| 6,289,369 B1 | 9/2001 | Sundaresan .................. 709/103 |
| 6,295,598 B1 | 9/2001 | Bertoni et al. |
| 6,341,324 B1 | 1/2002 | Caulk et al. |
| 6,370,681 B1 | 4/2002 | Dellarocas et al. |
| 6,378,072 B1 | 4/2002 | Collins et al. |
| 6,463,457 B1 | 10/2002 | Armentrout et al. |
| 6,526,491 B2 | 2/2003 | Suzuoki et al. |
| 6,665,699 B1 | 12/2003 | Hunter et al. .................. 709/102 |
| 6,665,783 B2 | 12/2003 | Zahir |
| 6,675,191 B1* | 1/2004 | Ito ................................ 718/102 |
| 6,728,959 B1 | 4/2004 | Merkey ......................... 718/102 |
| 6,785,756 B2 | 8/2004 | Candea et al. |
| 6,792,461 B1 | 9/2004 | Hericourt |
| 6,832,370 B1* | 12/2004 | Srinivasan et al. ............ 717/161 |
| 7,024,671 B2 | 4/2006 | Yamashita |
| 7,039,736 B2 | 5/2006 | Mantey et al. |
| 7,058,750 B1 | 6/2006 | Rankin et al. |
| 7,127,477 B2 | 10/2006 | Duncombe et al. |
| 7,236,738 B2 | 6/2007 | Settle |
| 7,236,998 B2 | 6/2007 | Nutter et al. |
| 7,298,377 B2 | 11/2007 | Fossum et al. |
| 7,304,646 B2 | 12/2007 | Iwata |
| 7,321,958 B2 | 1/2008 | Hofstee et al. |
| 7,340,629 B2* | 3/2008 | Kates et al. ................... 713/400 |
| 7,478,390 B2 | 1/2009 | Brokenshire et al. |
| 7,483,039 B1* | 1/2009 | Alben et al. .................. 345/596 |
| 7,506,123 B1 | 3/2009 | Labour et al. |
| 7,516,456 B2 | 4/2009 | Aguilar et al. |
| 7,522,168 B2 | 4/2009 | Stenson et al. |
| 7,565,651 B1 | 7/2009 | Carey |
| 7,734,827 B2 | 6/2010 | Iwamoto |
| 2001/0011291 A1* | 8/2001 | Arakawa et al. ............. 708/495 |
| 2002/0138637 A1 | 9/2002 | Suzuoki et al. .............. 709/230 |
| 2003/0154284 A1 | 8/2003 | Bernardin et al. |
| 2003/0195920 A1 | 10/2003 | Brenner et al. |
| 2004/0054883 A1 | 3/2004 | Goodman et al. ................ 713/1 |
| 2005/0066132 A1* | 3/2005 | Houki ........................... 711/137 |
| 2005/0081203 A1 | 4/2005 | Aguilar et al. |
| 2005/0091473 A1 | 4/2005 | Aguilar et al. |
| 2005/0188372 A1 | 8/2005 | Inoue et al. ................... 718/100 |
| 2005/0188373 A1 | 8/2005 | Inoue et al. ................... 718/100 |
| 2005/0268092 A1* | 12/2005 | Shankar et al. ............... 713/164 |
| 2006/0075274 A1* | 4/2006 | Zimmer et al. ................... 714/2 |
| 2006/0190942 A1 | 8/2006 | Inoue et al. |
| 2007/0074206 A1 | 3/2007 | Iwamoto .......................... 718/1 |
| 2007/0074207 A1 | 3/2007 | Bates et al. |
| 2007/0074212 A1 | 3/2007 | Bates et al. ................... 718/100 |
| 2007/0074221 A1 | 3/2007 | Stenson et al. ................ 718/106 |
| 2007/0083755 A1 | 4/2007 | Iwamoto ....................... 713/164 |
| 2007/0143436 A1* | 6/2007 | Heffley et al. ................ 709/213 |
| 2007/0198628 A1 | 8/2007 | Bates et al. ................... 709/201 |
| 2009/0147013 A1 | 6/2009 | Stenson et al. |

FOREIGN PATENT DOCUMENTS

| | | |
|---|---|---|
| GB | 2394336 | 4/2004 |
| JP | 2001005679 | 1/2001 |
| JP | 2002007364 | 1/2002 |
| JP | 2004246702 | 9/2004 |
| JP | 2004320174 | 11/2004 |
| JP | 2005235229 | 9/2005 |
| WO | WO 97/06484 | 2/1997 |
| WO | 0203208 | 1/2002 |
| WO | WO 02/091180 | 11/2002 |
| WO | 2004015553 | 2/2004 |
| WO | WO 2004/084069 | 9/2004 |

OTHER PUBLICATIONS

U.S. Appl. No. 11/238,077, entitled "Cell Processor Methods and Apparatus", to John P. Bates et al., filed Sep. 27, 2005.
U.S. Appl. No. 11/257,761, entitled "Secure Operation of Cell Processors", to Tatsuya Iwamoto, filed Oct. 24, 2005.
U.S. Appl. No. 11/238,085, entitled "Method and System for Performing Memory Copy Function on a Cell Processor", to Antoine Labour et al., filed Sep. 27, 2005.
U.S. Appl. No. 11/238,086, entitled "Operating Cell Processors Over a Network", to Tatsuya Iwamoto, filed Sep. 27, 2005.
U.S. Appl. No. 11/238,095, entitled "Cell Processor Task and Data Management", to Richard B. Stenson et al., filed Sep. 27, 2005.
Office Action dated May 13, 2008 issued for U.S. Appl. No. 11/238,086.
Notice of Allowance and Fee(s) Due dated Jan. 26, 2010 issued for U.S. Appl. No. 11/257,761.
U.S. Appl. No. 12/787,344, filed May 25, 2010.
Office Action dated Aug. 27, 2009 issued for U.S. Appl. No. 11/257,761.
Notice of Allowance and Fee Due(s) dated Nov. 3, 2008 issued for U.S. Appl. No. 11/238,085.
Final Office Action dated Aug. 5, 2008 issued for U.S. Appl. No. 11/238,085.
Office Action dated Feb. 20, 2008 issued for U.S. Appl. No. 11/238,085.
Office Action dated Aug. 30, 2007 issued for U.S. Appl. No. 11/238,085.
Notice of Allowance and Fee Due(s) dated Mar. 8, 2010 issued for U.S. Appl. No. 12/371,424.
Office Action dated Oct. 16, 2009 issued for U.S. Appl. No. 12/371,424.
U.S. Appl. No. 60/650,153, filed Feb. 4, 2005.
Final Office action dated Aug. 16, 2010 issued for U.S. Appl. No. 11/238,087.
Office Action dated Apr. 14, 2010 issued for U.S. Appl. No. 11/238,087.
D S Milojicic et al., "Process Migration" ACM Computing Surveys, ACM, New York, NY, US, vol. 32, No. 3, Sep. 2000, pp. 241-299, XP002254767 ISSN: 0360-0300.
K Chanchio et al., "Data Collection and Restoration for Heterogeneous Process Migration" Software Practice & Experience, Wiley & Sons, Bognor Regis, GB, vol. 32, No. 9, Jul. 25, 2002, pp. 845-871, XP001115308 ISSN: 0038-0644.
European Search Report for European application No. 06254919 dated Dec. 21, 2007.
Office Action (Final) dated Apr. 20, 2009 for U.S. Appl. No. 11/238,086.
Office Action (Final) dated May 7, 2009 for U.S. Appl. No. 11/257,761.
Office Action dated Mar. 12, 2010 issued for U.S. Appl. No. 11/238,077.
William et al., "The Potential of the Cell Processor for Scientific Computing", Conference on Computing Frontiers, ACM, 2006, pp. 9-20.
Gschwind, "Chip Multiprocessing and the Cell Broadband Engine", ACM, 2006, pp. 1-8.
Office Action dated Jan. 10, 2008 issued for U.S. Appl. No. 11/238,095.
Final Office Action dated Jul. 29, 2008 issued for U.S. Appl. No. 11/238,095.
Notice of Allowance and Fee(s) Due dated Nov. 25, 2008 issued for U.S. Appl. No. 11/238,095.
Office Action dated Nov. 4, 2008 issued for U.S. Appl. No. 11/238,086.
Office Action dated Nov. 24, 2008 issued for U.S. Appl. No. 11/257,761.
Office Action dated Jun. 22, 2010 issued for U.S. Appl. No. 11/238,086.
Final Office Action dated Feb. 5, 2010 issued for U.S. Appl. No. 11/238,086.
Office Action dated Aug. 11, 2009 issued for U.S. Appl. No. 11/238,086.
Office Action dated May 27, 2010 for Chinese Patent application No. 200610142304.7 and its English translation.
Office Action dated May 6, 2010 for Chinese Patent application No. 200610142305.1 and its English translation.
Office Action dated Aug. 16, 2010 for Japanese patent application No. 2006-262023 and its English translation.

(56) References Cited

OTHER PUBLICATIONS

Office Action dated Aug. 16, 2010 for Japanese patent application No. 2006-262024 and its English translation.

Final Office Action dated Aug. 5, 2010 issued for U.S. Appl. No. 11/238,077.

U.S. Appl. No. 11/238,085, entitled "Method and System for Performing Memory Copy Function on a Cell Processor", to Antoine Labour et al, filed Sep. 27, 2005.

"Fast context switches: compiler and architectural support for pre-emptive scheduling", by Jeffery S Snyder, David B Whaley, and Theodore p. Baker, Microprocessors and Microsystems vol. 19, No. 1, Feb. 1995.

International application No. PCT/US2006/061085, "The International Search Report and the Written Opinion of the International Searching Authority", Jul. 24, 2007.

Sony Computer Entertainment Incorporated , "Cell Broadband Engine Architecture", Version 1.0, Aug. 8, 2005.

Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.

J. A. Kahle et al. "Introduction to the Cell Multiprocessor" IBM Journal of Research and Development, vol. 49, No. 4-5, , Jul. 2005, pp. 589-604.

George M. Candea et al. "Vassal: Loadable Scheduler Support for Multi-Policy Scheduling" Proceedings of the Usenix Window NT Symposium, Aug. 1998, pp. 157-166.

Alexandre E. Eichenberger et al., "Optimizing Compiler for a Cell Processor", Proceedings of 14th International Conference on Parallel Architectures and Compilation Techniques, 2005 (PACT'05), pp. 161-172.

B. Flachs et al., "A Streaming Processing Unit for a Cell Processor", 2005 IEEE International Solid-State Circuits Conference—Digest of Technical Papers, pp. 134-135.

Scott Whitman, "Dynamic Load Balancing for Parallel Polygon Rendering", IEEE Computer Graphics and Applications, vol. 14, No. 4, Jul. 1994, pp. 41-48.

Jaspal Subhlok et al., "Communication and Memory Requirements as the Basis for Mapping Task and Data Parallel Programs", Supercomputing' 94, Proceedings Washington, DC, 1994 IEEE, pp. 330-339.

Alan Heirich, "Optimal Automatic Multi-Pass Shader Partitioning by Dynamic Programming", Graphics Hardware (2005), pp. 91-98.

International application No. PCT/US2006/037345, "The International Search Report" and "The Written Opinion of the International Searching Authority", Feb. 8, 2007.

International application No. PCT/US2006/037334, "The International Search Report and the Written Opinion of the International Searching Authority", Feb. 7, 2007.

International application No. PCT/US2006/037336, "The International Search Report and the Written Opinion of the International Searching Authority", Feb. 23, 2007.

International application No. PCT/US2006/037338, "The International Search Report and the Written Opinion of the International Searching Authority", Feb. 14, 2007.

\* cited by examiner

EFFICIENT TASK SCHEDULING BY ASSIGNING FIXED REGISTERS TO SCHEDULER

FIELD OF THE INVENTION

Embodiments of the present invention relate to digital processing and more particularly to task scheduling in digital processing.

BACKGROUND OF THE INVENTION

A major advance in electronic computation has been the development of systems that can perform multiple operations simultaneously. Such systems are said to perform parallel processing. Recently, cell processors have been developed to implement parallel processing on electronic devices ranging from handheld game devices to main frame computers. A typical cell processor has a power processor unit (PPU) and up to 8 additional processors referred to as synergistic processing units (SPU). Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. A small local memory (typically about 256 kilobytes) is associated with each of the SPUs. This memory must be managed by software to transfer code and data to/from the local SPU memories.

The SPU have a number of advantages in parallel processing applications. For example, the SPU are independent processors that can execute code with minimal involvement from the PPU. Each SPU has a high direct memory access (DMA) bandwidth to RAM. An SPU can typically access the main memory faster than the PPU. In addition each SPU has relatively fast access to its associated local store. The SPU also have limitations that can make it difficult to optimize SPU processing. For example, the SPU have no coherent memory and no hardware cache. In addition, common programming models do not work well on SPU.

A typical SPU process involves retrieving code and/or data from the main memory, executing the code on the SPU to manipulate the data, and outputting the data to main memory or, in some cases, another SPU. To achieve high SPU performance it is desirable to optimize the above SPU process in relatively complex processing applications. For example, in applications such as computer graphics processing SPUs typically execute tasks thousands of times per frame.

One prior art task management system used for cell processors is based on a software concept referred to as "threads". A "thread" generally refers to a part of a program that can execute independently of other parts. Operating systems that support multithreading enable programmers to design programs whose threaded parts can execute concurrently. When a thread is interrupted, a context switch may swap out the contents of an SPU's local storage to the main memory and substitute 256 kilobytes of data and/or code into the local storage from the main memory where the substitute data and code are processed by the SPU. A context switch is the computing process of storing and restoring the state of a SPU or PPU (the context) such that multiple processes can share a single resource.

A typical context switch involves stopping a program running on a processor and storing the values of the registers, program counter plus any other operating system specific data that may be necessary. For example, to prevent a single process from monopolizing use of a processor certain parallel processor programs perform a timer tick at intervals ranging from about 60 ticks per second to about 100 ticks per second. If the process running on the processor is not completed a context switch is performed to save the state of the processor and a new process (often the task scheduler or "kernel") is swapped in. As used herein, the kernel refers to a central module of the operating system for the parallel processor. The kernel is typically the part of the operating system that loads first, and it remains in main memory. Typically, the kernel is responsible for memory management, process and task management.

Frequent context switches can be quite computationally intensive and time consuming, particularly for processors that have a lot of registers. As used herein, a register refers to a special, high-speed storage area within the processor. Typically, data must be represented in a register before it can be processed. For example, if two numbers are to be multiplied, both numbers must be in registers, and the result is also placed in a register. The register may alternatively contain the address of a memory location where data is to be stored rather than the actual data itself. Registers are particularly advantageous in that they can typically be accessed in a single cycle. Program compilers typically make use of as many software-configurable registers as are available when compiling a program.

The number of registers that a processor has and the size of each register (number of bits) affect the power and speed of the processor. For example a 32-bit processor is one in which each register is 32 bits wide. Therefore, each processor instruction can manipulate 32 bits of data. Although large register sizes allow faster processing, larger size registers take longer to store during a context switch, particularly if there are a large number of them. For example, in certain types of cell processors, the SPU may have 128 registers that are each 128 bits wide. If all these registers are used by one context, storing the contents of the registers can take a lot of time, even if the contents of the registers can be stored on the SPU local store. However, the SPU local store is relatively small and it may be necessary to store the contents of the registers in main memory, which takes even more time. Thus, it is desirable to avoid such context switches.

One prior art technique for avoiding context switches is to split the available registers for a processor amongst multiple threads. Since threads can operate independently the available registers may be divided up amongst the various threads of a program. For example, 128 registers for an SPU may be divided into two or more groups (e.g., two groups of 64, four groups of 32, etc.). The different groups of registers may be explicitly assigned to different program threads at compile time and these different program threads may run on the SPU simultaneously. The contents of registers assigned to a particular software thread need not be swapped out, e.g., during direct memory access (DMA). Unfortunately, each group of registers has to be explicitly assigned to a thread a compile time since the use of registers is not indexed. Consequently, this technique does not allow general threads to be reassigned to different registers during runtime.

In some prior art techniques certain special-purpose registers, such as stack pointers, are physically assigned in hardware to the kernel. However, even in these techniques the contents of general purpose registers (i.e., registers that are configurable in software) must be stored by a context switch when control of the processor is handed over to the kernel.

Thus, there is a need in the art, for a task scheduling method that avoids excessive use of context switches.

SUMMARY OF THE INVENTION

Embodiments of the present invention are directed to task scheduling in a processing system having a main memory and a processor having a plurality of software-configurable registers. The system is operable under the control of a kernel and a program code. A subset of the plurality of registers is reserved for use by the kernel. Upon occurrence of an interrupt event requiring control of the processor by the kernel, the kernel may be run on the processor without saving the contents the plurality of registers. In certain embodiments of the present invention, the processor may be a synergistic processing unit (SPU) of a cell processor having one or more synergistic processing elements (SPE) coupled to the data bus. Each SPE may have a synergistic processor unit (SPU), a plurality of software-configurable registers and a local store.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention take advantage of the fact that many context switches result from interrupt events that require control of a processor (e.g., an SPU in a cell processor) and from the fact that a typical context for task-scheduling kernel does not require the use of a lot of registers. Such interrupt events happen frequently. Therefore, in embodiments of the present invention the available registers in a processor are configured such that the kernel context is always resident on the processor. For example, 128 registers can be split into 8 for kernel and 120 for tasks. With this division of registers, the kernel context can always be resident on the processor and may start up, when called for, with no need to wait for a context switch.

Figure 1:
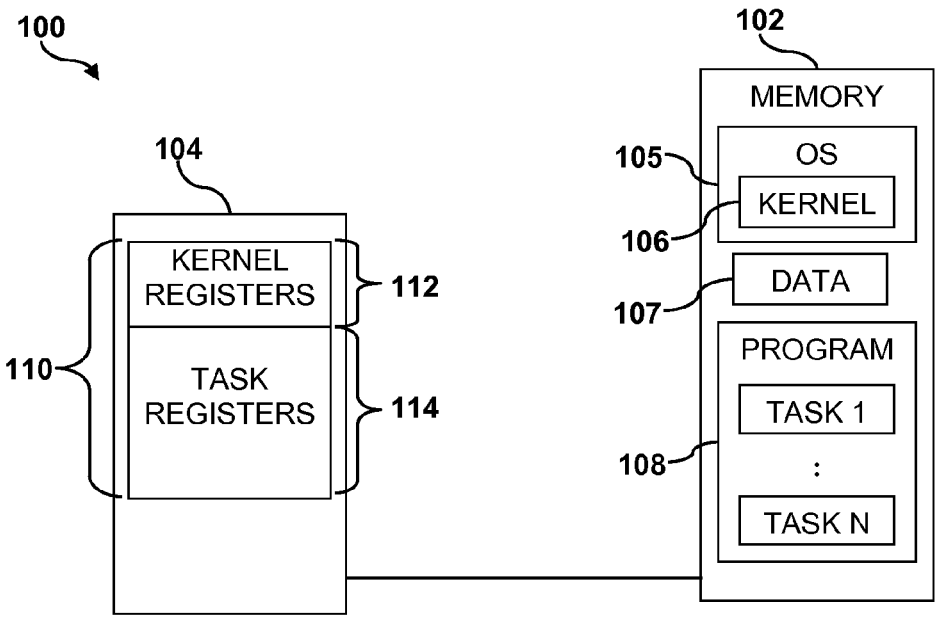
FIG. 1 is a block diagram of a processing system according to an embodiment of the present invention.

As shown in FIG. 1 a processing system 100 may include a memory 102 and a processor 104. As used herein, the term "processor" generally refers to a component of a digital computer that interprets and executes instructions and data contained in software. As used herein, the term software generally refers to all information processed by a digital computer system, including programs and data. The memory 102 contains an operating system 105, which includes a kernel 106. As used herein, the term "kernel" refers to the contents of a few registers and program resident on memory. In certain embodiments of the present invention, it is desirable that the kernel 106 be well suited to handle MFC, abstracting tag management, synchronization and software pipelining. The kernel 106 may implement a minimum functionality, such as interrupt handling and task dispatching, and possibly DMA handling, which could include context switching tasks or threads. A task or thread refers to a computer program in a state of execution. Since there are many programs, and hardware access is limited, the kernel also implements scheduling, i.e., deciding when and how long a program should be able to make use of a piece of hardware.

The memory 102 may also contain a program 108 that may be divided up into a number of different tasks. In addition, the memory 102 may also contain data 107 that is processed by the program 108 and/or operating system 105.

The processor 104 can execute one or more of the tasks at a given time. The processor 104 includes a set of software-configrurable registers 110. As used herein, a register is said to be software-configurable if it can be configured by a software program when the program is compiled. A first subset 112 of the registers 110 is reserved for use by the kernel 106. A second subset 114 of the registers 110 remains available for use by the various tasks of the program 108. As a result of the reservation of the first subset 112 a context of the kernel 106 may be made continuously resident on the processor 104. Consequently, the information stored in these registers is available when a task running on the processor 104 is interrupted by an interrupt event that requires turning control of the processor over to the kernel 106.

By way of example, the processor 104 may be a synergistic processing unit (SPU) of a cell processor and the memory 102 may be a local store (LS) associated with the SPU. In such a case the LS may also include a minimum interrupt and DMA handler code as part of the code for one or more tasks stored in the LS and running on the SPU. These codes request or trigger the events that cause interrupts. The kernel 106 handles these interrupts.

The registers 110 may be of any suitable size. Preferably, the registers are about 32 bits wide or wider, more preferably about 64 bits wide or wider and most preferably, about 128 bits wide or wider. The system 100 may operate in a non-privileged mode in which a user has access to all of the registers 110. Alternatively, the system 100 may operate in a privileged mode wherein the user is denied access to certain registers.

Figure 2:
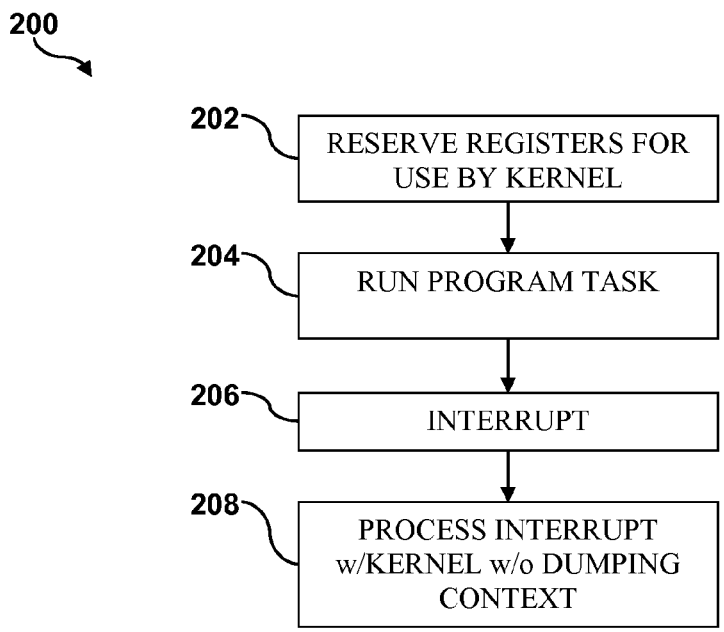
FIG. 2 is a flow diagram illustrating a method for task scheduling according to an embodiment of the present invention.

Operation of the system 100 may be understood with reference to the flow diagram 200 depicted in FIG. 2. Specifically, at step 202 the first subset 112 of registers 110 are reserved for the use of the kernel 106. The first subset 112 may be reserved when the program 108 is compiled. The processor 104 may access a compiler program that compiles the program 108 from source code. Alternatively, the program 108 may be compiled on another processing system and stored to memory 102 after it has been compiled. The program 108 then runs at step 204. At step 206 an interrupt occurs. The interrupt requires that control of the processor 104 be handed over to the kernel 106. Examples of such interrupts include synchronous events, such as timer ticks (which may be implemented by a decrementer), and asynchronous events such as a decrementer hitting zero, a signal notification, a mailbox event, a direct memory access (DMA) completion, or a reservation loss event. In the particular case of an SPU on a cell processor implementation known as Cell Broadband Engine Architecture (CBEA) events that cause interrupts include Multisource Synchronization, Privileged Attention, Lock Line Reservation Lost, Signal Notification 1/2 events, Mailbox events, SPU Decrementer Events, and Memory Flow Controller (MFC) events.

To process the interrupt, the processor 106 may stop processing the program task at this point, although it may not need to do so depending on the nature of the interrupt. The actions of the processor may be controlled by software generally referred to as an interrupt handler. The interrupt handler software may be a subroutine within a task of the program 108 or within the kernel 106. Normally, an interrupt handler would have to perform a context switch of the registers 110 to handle the interrupt. However, since the first subset 112 of registers 110 has already been set aside for use by the kernel 106, the processor 104 may begin processing the interrupt at step 208 without having to save the context of the task, i.e., without having to save the contents of the second subset 114 of registers 110. In general, it is not desirable to load any values into the first register subset 112. This allows the Kernel 106 should be able to switch back to Tasks with clean registers. Alternatively loading may happen simply as an initial part of invocation of the kernel 106 by an interrupt. The interrupt may be processed using the kernel 106 running on the processor. Once processing of the interrupt is complete the processor may resume processing the task without having to dump the information stored in the first register subset 112 or reload a task context into the second register subset 114. Preferably, the contents of the first register set 112 remain resident. When a task switch is needed, the contents of the second register subset 114 can be saved and another context can be loaded to the second register subset 114.

By way of contrast, a prior art-type system would have to perform a context switch of the task context from the processor 104 by saving the contents of all the registers 110 and then load the kernel context into the registers to process the interrupt. After interrupt processing is complete, the prior art system would then have to perform another context switch to reload the saved contents of the registers 110 before task processing could resume. Thus, embodiments of the present invention eliminate a feature of the prior art (the two context switches) while retaining their function (allowing the interrupt to be processed and allowing the task to resume).

Embodiments of the present invention are particularly suitable for use with small processors that have a large number of relatively large registers. Examples of such processors include the synergistic processing units (SPU) used in cell processors.

Figure 3:
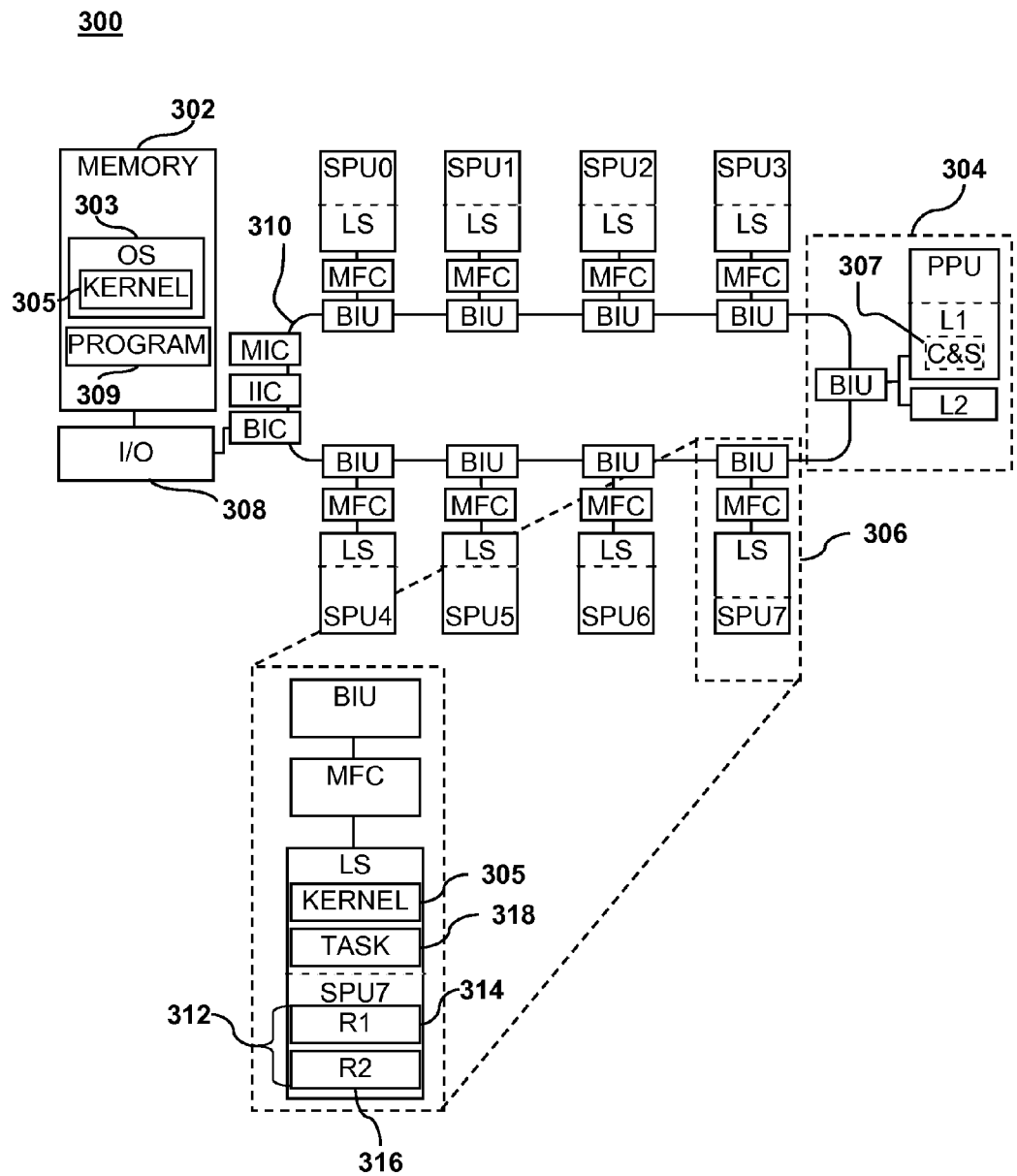
FIG. 3 is a block diagram of a cell processor according to an embodiment of the present invention.

By way of example, and without limitation, FIG. 3 illustrates a type of cell processor 300 according to an embodiment of the present invention. In the example depicted in FIG. 3, the cell processor 300 includes a main memory 302, power processor element (PPE) 304, and a number of synergistic processor elements (SPEs) 306. In the example depicted in FIG. 3, the cell processor 300 includes a single PPE 304 and eight SPE 306. The cell processor 300 may also include an input/output (I/O) function 308. In such a configuration, seven of the SPE 306 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 3.

The main memory 302 typically includes both general-purpose and nonvolatile storage, as well as special-purpose hardware registers or arrays used for functions such as system configuration, data-transfer synchronization, memory-mapped I/O, and I/O subsystems. In embodiments of the present invention, an operating system 303 may be resident in main memory 302. The operating system 303 may include a kernel 305, as described above. The main memory 302 may also contain a program 309 that runs on the PPE. The program 309 may be divided up into multiple tasks that can be executed on the SPEs.

Although only a single PPE is shown in FIG. 3, some cell processor implementations, such as cell broadband engine architecture (CBEA), the cell processor 300 may have multiple PPEs organized into PPE groups, of which there may be more than one. These PPE groups may share access to the main memory 302. Furthermore the cell processor 300 may include two or more groups SPEs. The SPE groups may also share access to the main memory 302. Such configurations are within the scope of the present invention.

An Element Interconnect Bus 310 connects the various components listed above. Each SPE and the PPE can access the bus 310 through bus interface units BIU. The cell processor 300 may also includes two controllers typically found in a processor: a Memory Interface Controller MIC that controls the flow of data between the bus 310 and the main memory 302, and a Bus Interface Controller BIC, which controls the flow of data between the I/O 308 and the bus 310. Although the requirements for the MIC, BIC, BIUs and bus 310 may vary widely for different implementations, those of skill in the art will be familiar their functions and circuits for implementing them.

The cell processor 300 may also include an internal interrupt controller IIC. The IIC component manages the priority of the interrupts presented to the PPE. In a cell processor system, software often must first check the IIC to determine if an interrupt was sourced from an external system interrupt controller. The IIC allows interrupts from the other components the cell processor 300 to be handled without using the main system interrupt controller. The IIC may be regarded as a second level controller. The IIC is not intended to replace the main system interrupt controller for handling interrupts from all I/O devices. The system interrupt controller may handle interrupts originating external to the cell processor.

By way of example, the PPE 304 may be a 64-bit PowerPC Processor Unit (PPUs) with associated caches. The PPE 304 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 304 is the management and allocation of tasks for the SPEs 306 in the cell processor 300.

Each SPE 306 is includes a synergistic processor unit (SPU) and its own local storage area LS. The SPUs are less complex computational units than the PPE 304 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPUs in a system managed by the PPE 304 allow for cost-effective processing over a wide range of applications.

Each SPE 306 includes a dedicated memory flow controller (MFC) that includes an associated memory management unit that can hold and process memory-protection and accesspermission information. The MFC components are essentially the data transfer engines for the SPU. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC direct memory access (DMA) commands (or MFC DMA commands). These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPE local storage areas, if they are aliased into the real address space (that is, if MFC_SR1[D] is set to '1').

An MFC presents two types of interfaces: one to the SPUs and another to all other processors and devices in the cell processor 300. The SPUs may use a channel interface to control the MFC. In this case, code running on an SPU can only access the MFC SPU command queue for that SPU. Other processors and devices control the MFC by using memory-mapped registers. It is possible for any processor and device in the system to control an MEC and to issue MFC proxy command requests on behalf of the SPU. The MFC also supports bandwidth reservation and data synchronization features. To facilitate communication between the SPUs and/or between the SPUs and the PPU, the SPEs 306 and PPE 304 may include signal notification registers that are tied to signaling events. Typically, the PPE 304 and SPEs 306 are coupled by a star topology in which the PPE 304 acts as a router to transmit messages to the SPEs 306. Such a topology does not provide for direct communication between SPEs. Instead each SPE and the PPE have a one-way signal notification register referred to as a mailbox. The mailbox can be used by an SPE to host OS synchronization.

The SPU local storage LS typically includes one or more separate areas of memory storage, each one associated with a specific SPU. Each SPU can only execute instructions (including data load and data store operations) from within its own associated local storage domain. Therefore, any required data transfers to, or from, storage elsewhere in a system is typically performed by issuing a direct memory access (DMA) command from the memory flow controller (MFC) to transfer data between the local storage domain (of the individual SPE).

Each SPU also includes a set of registers. A typical SPU may have 128 software-configurable registers 312, each register being, e.g., 128 bits wide. Larger or smaller sized registers may alternatively be used. Such a large number of large registers makes embodiments of the present invention particularly suitable for use with a cell processor. Consequently, as shown in the inset in FIG. 3, the registers have been divided into to subsets. A fist subset 314 is reserved for use by the kernel 305 of the operating system 303, as described above. A second subset 316 remains available for use by program tasks 318. In a typical implementation, the first subset 314 may be a relatively small subset of the entire set of registers, e.g., less than half of the available registers. Generally, it is desirable to reserve as small a subset of registers as possible for use by the kernel. By way of example, if the SPU has 128 registers available, the first subset 314 may contain 8 of them and the second subset 316 may contain the remaining 120 for use by programs running on the SPU. Such programs may include tasks from the main program or other routines or functions that are specific to operation of the SPU. In some embodiments, the SPU may include in its local store the kernel 305, or a portion thereof, that executes in the event of an interrupt.

The kernel 305 may remain resident in the SPU LS so that the SPU can quickly access it to process an interrupt. Alternatively, does the SPU may load the kernel (or some subset of kernel code) to process the interrupt. For example, in an operating system with a rich feature set, some parts of the kernel may be stored in the main memory 302. These parts of the kernel 305 may then be run like tasks when loaded to the local storage LS.

If the kernel 305 is configured to handle all the interrupts, any interrupt or MFC event can cause the program 309 jump to the kernel 305. In this way the kernel 305 can handle all the tag management for MFC transfers. By way of example, a system call into the kernel 305 may be used when starting any MFC DMAs, so that the kernel captures 305 all the kicks and completions. If the kernel handles interrupts, user tasks within the program 309 do not need to worry about multiple interleaved MFC transfers and synchronization. This means that a task within the program 309 can request MFC, be put on hold, and the kernel 305 can schedule other tasks on the local store LS. Putting the task on hold can involve a context switch, with register saving.

The kernel 305 may provide other functionalities in addition to scheduling, interrupt handling, and MFC management. In certain embodiments of the invention, one or more rich features of an operating system (OS) may be built onto the kernel 305. For example, the kernel 305 may further include functionalities such as task management or communication between the SPEs 306 and the PPE 304. Task management may include loading multiple execution images into the local store LS, which allows pipeline processing of multiple tasks while waiting for any MFC transfers. Such functionalities may be implemented as tasks that are loaded, e.g., from the main memory 302 when called for, so that the footprint of the portion of the kernel 309 resident on local store LS remains small. Communication with other processor elements within the cell processor 300 can also be implemented in such manner, that the code for this functionality would not always take up space in the local store LS.

Typically, there are three levels context on an SPE (1) a register context, (2) a local store LS context and (3) a main memory 302 context. The kernel 305 operating on a particular SPE 306 may maintain its register and LS context and manage Tasks context between register and LS. Task context management between LS and system memory could be handled by the OS feature that is described above.

By way of example, the kernel 305 may be part of an SPU Task Manager (STM). Such an STM may read one or more task definitions stored in the main memory into the local memory of a selected SPU. Based on information contained in the task definitions the SPU loads code and/or data related to the task definitions from the main memory into the local memory associated with the selected SPU. The selected SPU then performs one or more tasks using the code and/or data. An SPU Task Manager is described in commonly-assigned, co-pending, U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, which was filed Sep. 27, 2005 and has been published as US patent publication No. 20070074207, the entire disclosures of which are incorporated herein by reference.

It is noted that while the preceding discussion uses the cell processor as an example, embodiments of the invention are not limited to implementation on a cell processor.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a processing system having a main memory and a processor having a local memory and a plurality of software-configurable registers, a method for task scheduling, comprising the steps of:
    reserving a subset of the plurality of software-configurable registers for use by a kernel wherein portions of the kernel are stored in the local memory of the processor and other portions of the kernel are stored in the main memory;
    reserving a different subset of the plurality of registers for use by one or more tasks of a program code;
    upon occurrence of an interrupt event requiring control of the processor by the kernel, the interrupt is configured to stop a task of the program code running on the processor and load one or more features of the kernel required to service the interrupt event that are stored in the main memory to the local memory of the processor;
    running the one or more features of the kernel loaded on the local memory of the processor utilizing the subset of the plurality of software-configurable registers reserved for use by the kernel without saving contents of the plurality of software-configurable registers reserved for the one or more tasks of the program code; and
    processing the interrupt using the kernel running on the processor.

2. The method of claim 1 wherein each of the registers in the plurality of software configurable registers is greater than or equal to 32 bits wide.

3. The method of claim 1 wherein each of the registers in the plurality of registers is greater than or equal to 64 bits wide.

4. The method of claim 1 wherein each of the registers in the plurality of registers is greater than or equal to 128 bits wide.

5. The method of claim 1 wherein the interrupt event is a decrementer hitting zero, a timer tick, a mailbox signal, a signal notification register signal, a direct memory access (DMA) completion or reservation loss event.

6. The method of claim 1 wherein, reserving the subset of registers includes allowing a user to access all of the registers in the plurality of software configurable registers.

7. The method of claim 1 wherein the plurality of software configurable registers includes 128 registers.

8. The method of claim 7 wherein reserving a subset of the plurality of registers for use by the kernel includes reserving about 8 registers for use by the kernel.

9. The method of claim 1 wherein the one or more features of the kernel include task management, task scheduling, interrupt handling, memory flow controller (MFC) management, one or more operating system features or communication between the processor and another processor.

10. A processing system, comprising:
    a main memory;
    one or more processors, each processor having a local memory and a plurality of software-configurable registers coupled to the main memory,
    a kernel and a program code resident in the main memory,
    wherein a subset of the plurality of software-configurable registers are reserved for use by the kernel and a different subset of the plurality of software-configurable registers are reserved for use by one or more tasks of a program code, wherein portions of the kernel are stored in the local memory of one or more of the one or more processors and other portions of the kernel are stored in the main memory; and
    wherein the program includes a one or more instructions that execute upon occurrence of an interrupt event requiring return of control of a particular processor of the one of the one or more processors to the kernel, the one or more instructions being configured to stop a task of the program code running on the particular processor, load one or more features of the kernel required to service the interrupt event that are stored in the main memory to the local memory of the particular processor, and run the one or more features of the kernel loaded on local memory of the particular processor utilizing the subset of the plurality of software-configurable registers reserved for use by the kernel without saving contents of the plurality of software-configurable registers reserved for the one or more tasks of the program code; and
    processing the interrupt using the kernel running on the particular processor.

11. The system of claim 10 wherein the one or more processors include a power processing unit (PPU) and one or more synergistic processing elements (SPE), each SPE having a synergistic processing unit (SPU) and a local store.

12. The system of claim 11 wherein each SPE includes between about 8 registers and about 128 registers.

13. The system of claim 12 wherein each SPE includes 128 registers.

14. The system of claim 13 wherein the subset of the plurality of registers reserved for use by the kernel includes about 8 registers.

15. The system of claim 11 wherein each register on the one or more SPE is greater than or equal to 32 bits wide.

16. The system of claim 11 wherein each register on the one or more SPE is greater than or equal to 128 bits wide.

17. The system of claim 10 wherein the system is configurable to operate in a non-privileged mode wherein a user has access to all of the software-configurable registers.

18. The system of claim 10 wherein the system is configurable to operate in a privileged mode wherein a user is denied access to a certain subset of the software.

19. The system of claim 10 wherein the interrupt event is a decrementer hitting zero, a timer tick, a mailbox signal, a signal notification register signal or a direct memory access (DMA) completion or reservation loss event.

20. The system of claim 10 wherein the one or more features of the kernel include task management, task scheduling, interrupt handling, memory flow controller (MFC) management, one or more operating system features or communication between the processor and another processor.

21. A processor system, comprising:
   a data bus;
   a main memory coupled to the data bus, the main memory containing one or more task definitions;
   a central processor coupled to the data bus;
   one or more secondary processing elements coupled to the data bus, wherein each secondary processing element has a processor unit, a plurality of software-configurable registers and a local memory, and
   an operating system kernel and a program code resident in the main memory, wherein a subset of the plurality of software-configurable registers are reserved for use by the kernel and a different subset of the plurality of software-configurable registers are reserved for use by one or more tasks of a program code, wherein portions of the kernel are stored in the local memory of one or more of the one or more secondary processing elements and other portions of the kernel are in the main memory; and
   wherein the program includes one or more instructions that execute upon occurrence of an interrupt event requiring return of control of a particular processor of the one of the one or more processors to the kernel, the one or more instructions being configured to stop a task of the program code running on the particular processor, load one or more features of the kernel required to service the interrupt event that are stored in main memory to the local memory of the particular processor, and run the one or more features of the kernel loaded on the local memory of the particular processor utilizing the subset of the plurality of software-configurable registers reserved for use by the kernel without saving contents of the plurality of software-configurable registers reserved for the one or more tasks of the program code, and
   processing the interrupt using the kernel running on the particular processor.

* * * * *